United States Patent [19]
Marquis et al.

[11] 3,961,692
[45] June 8, 1976

[54] VARIABLE TORQUE ELECTRIC CLUTCH AND BRAKE

[75] Inventors: Ray L. Marquis, Blookfield; Frank H. Beckman, New Britain, both of Conn.

[73] Assignee: Kalart Victor Corporation, Plainville, Conn.

[22] Filed: Nov. 1, 1974

[21] Appl. No.: 519,829

[52] U.S. Cl. .......................... 192/84 A; 192/107 M
[51] Int. Cl.² .......................................... F16D 19/00
[58] Field of Search .......... 192/84 A, 84 B, 84 AA, 192/84 AB, 84 C, 107 M, 107 C

[56] References Cited
UNITED STATES PATENTS

| | | | |
|---|---|---|---|
| 1,629,304 | 5/1927 | Price | 192/84 A |
| 2,400,625 | 5/1946 | Bloomfield | 192/84 A |
| 2,942,710 | 6/1960 | Wiedmann | 192/84 A |
| 3,246,725 | 4/1966 | Brashear, Jr. | 192/84 A |
| 3,310,141 | 3/1967 | Smirl | 192/84 A |
| 3,679,034 | 7/1972 | Miller | 192/84 A |

*Primary Examiner*—Samuel Scott
*Assistant Examiner*—Randall Heald
*Attorney, Agent, or Firm*—Hane, Baxley & Spiecens

[57] ABSTRACT

In a magnetic clutch a rotatable axially transferrable input disc which is part of a magnetic flux path including a magnetic cup in the output structure, engages annular friction surfaces on the output structure when magnetic flux is generated in the flux path by a coil. The friction surfaces are part of a rotatable coil and a magnetic cup attached to the driven shaft about which the input disc rotates freely in the absence of flux. The frictional torque generated by the engagement of the disc and the friction surfaces is proportional to the voltage applied to the flux-producing coil. When the input disc is locked, application of flux results in a braking action on the driven shaft.

9 Claims, 4 Drawing Figures

VARIABLE TORQUE ELECTRIC CLUTCH AND BRAKE

BACKGROUND OF THE INVENTION

This invention relates to the electromechanical clutches and especially to a novel arrangement in which the input structure comprises a disc and the output structure comprises a combination of resilient and non-resilient frictional surfaces, the latter being part of a magnetic cup containing a magnet coil mounted coaxially with and in juxtaposition to the input disc. The flux produced by the coil draws together the input and output structures with a force which depends upon the amount of power applied to the coil.

THE INVENTION

An object of this invention is to provide a compact and efficient magnetic clutch having high torque characteristics.

Another object of this invention is to provide a magnetic clutch capable of producing high torque with the expenditure of little coil power.

A further object is to provide an improved magnetic clutch having long life and substantially constant torque transmitting characteristics under conditions of extensive high-slip usage.

A still further object is to provide a magnetic clutch having improved flux-path characteristics.

SUMMARY OF THE INVENTION

A clutch is provided with a rotatable input disc coaxial with and in juxtaposition to an assembly comprising a coil, a magnetic cup, and a plurality of annular friction pads. The coil generated flux a path of which includes the cup and the disc, causes the disc and the friction pad to be drawn together with a force approximately proportional to the power applied to the coil.

BRIEF DESCRIPTION OF THE INVENTION

DESCRIPTION OF THE PREFERRED EMBODIMENT

Figure 1:
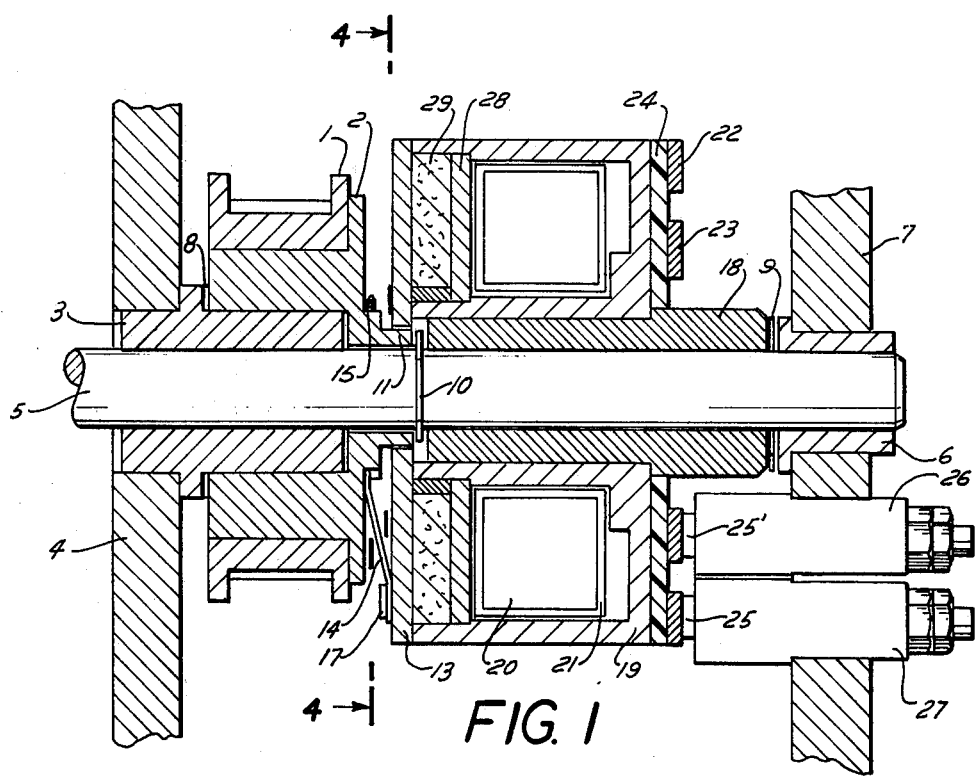
FIG. 1 is an elevational sectional view of a magnetic clutch in activated condition in accordance with one form of the present invention.

Referring now to the drawings, particularly FIG. 1, there is shown a magnetic clutch incorporating one embodiment of the present invention and designed for use with a mechanism such as the reel spindle drive of a motion picture projector where it is desirable to drive the film reel with a certain degree of slippage and also to brake the reel to insure controlled stopping of the film.

A suitable drive source such as a motor and belt, not shown, connects to a sprocket 1 fixedly attached to a rotary member 2 which is rotatable about the outer cylindrical surface of a bearing 3. The bearing is fixed in a supporting wall 4 and carries internally one end of a shaft 5 the other end of which is carried in a bearing 6 mounted on a plate 7 spaced from and in fixed relation to wall 4. Wall 4 and plate 7 may be parts of a film projector, tape recorder or the like. The axial position of shaft 5 may be established through use of washers 8 and 9 and groove ring 10.

Figure 3:
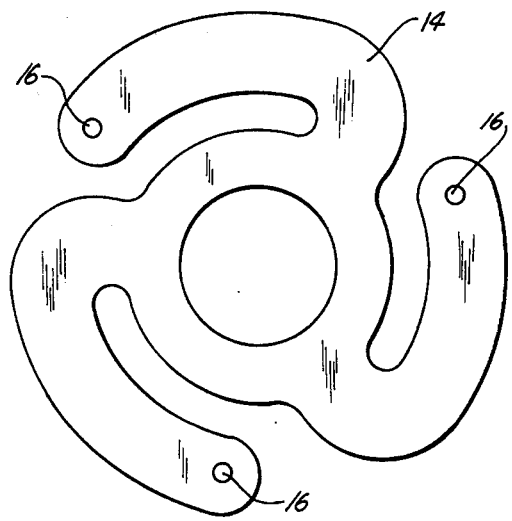
FIG. 3 is a view of the three-armed spring which retracts the disc when the clutch is disengaged.

One end 11 of member 2 is shown (FIG. 4) as hexagonal in shape, engaging, with suitable clearance, a corresponding hexagonal opening 12 in a plate 13. In place of the hexagonal connection any conventional spline or key form would be equally acceptable. A three-armed spring 14 (FIGS. 1 and 3) is held coaxially on member 2 by a ring 15 which may be pressed onto a stepped portion of member 2 as shown. Each of the three arms of spring 14 is provided with a hole 16 near its end and is attached to plate 13 by a rivet or screw 17. Plate 13 is provided with a radial groove 30 (FIG. 4) on its driving face for the purpose of clearing debris from the frictional surfaces that it is designed to engage.

Attached to shaft 5 is a hub member 18 onto which is pressed an annular cup 19 of magnet iron or other suitable magnetic material. Within cup 19 is a magnet coil 20 wound on a suitable bobbin 21. The ends of the coil are connected to slip rings 22 and 23 mounted on an insulating layer 24 of for instance glass-filled epoxy circuit board or the like. Slip rings 22 and 23 are contacted by brushes 25 and 25' held in insulating brush holders 26 and 27 mounted on plate 7.

An annular plate 28 of aluminum or other non-magnetic material rests on inner and outer ledges of the cup and forms the confining wall for an annular disc of leather 29 which is impregnated with a lubricant such as petroleum based lubricating oil and preferably vacuum-impregnated with silicone oil. Although leather is the preferred choice other fibrous and organic materials, such as Vita Flex, are suitable. To obtain a highly effective flux path hub member 18 and plate 13 are preferably made of iron.

Figure 2:
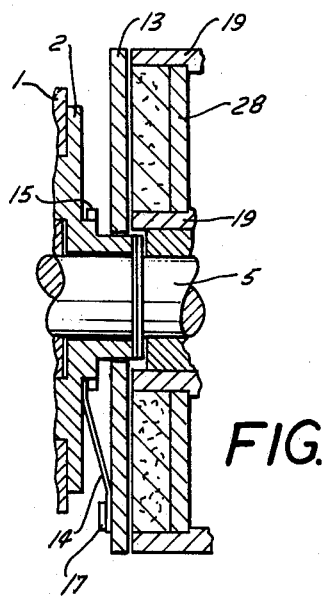
FIG. 2 is a view, partly in section, of part of the clutch shown in FIG. 1 when in non-activated condition.
Figure 4:
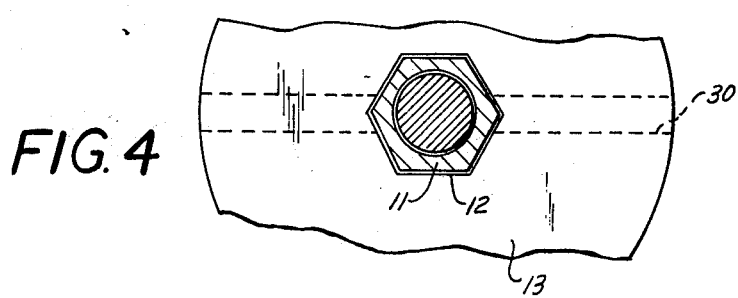
FIG. 4 is a fragmentary view along line 4—4 of FIG. 1.

When the clutch coil is not energized, disc plate 13 is held spaced apart from cup 19 and disc 20 by spring 14, the spring also pulling the disc further onto hexagonal portion 11 of member 2 as shown by comparing FIGS. 2 and 4. When the clutch coil is energized the magnetic flux pulls plate 13 into frictional engagement with leather disc 29 and the inner and outer rims of cup 19. The rotational motions of sprocket 1 and plate 13 are transferred to cup 19 and shaft 5 and thus to the load connected to the left end of shaft 5 in FIG. 1. The force of the torque transmitted between plate 13 and cup 19 is generally proportional to the power applied to the coil 20. At low power the clutch can act to provide a drag on, for example, a reel. At higher power the clutch can provide a take-up torque which can be adjusted by changing the applied power. At still higher power the clutch will act as a brake to stop quickly, for example, a rotating reel of motion picture film. Obviously, a pair of such clutches connected to the feed and take-up reels of a film projector or tape recorder can be programmed to drag, drive, or brake the reels to provide rapid and safe searching for a particular portion of the film or tape.

The theory and mode of interaction between plate 13 and cup 19 and leather disc 29 are not fully understood at the present time, but since the practice of the invention relies on specific conditions, it is important to know these conditions of construction. The present invention differs from clutches of the prior art in that the interface action between the plate 13 on one hand and the cup 19 and the leather disc on the other is also not fully understood and is believed to be complex. In the preparation of the cup and leather disc it is necessary that the pre-impregnated leather and the rim ends of the cup be ground simultaneously on an abrasive surface. When the grinding is complete the leather surface will protrude very slightly beyond the metal edges of the cup, usually between 30 and 10 thousandths of an inch depending upon the nature of the leather and that of the abrasive surface. Marked departure from this range reduces the efficiency of the clutch.

It is also believed that the lower lubricity of silicone oils as compared to conventional lubricating oils enhances the frictional behavior at the interface of the input and output structures.

It is therefore believed that the improved characteristics of the clutch result from the following conditions:

1. The frictional interface at the plate 13 is provided partly by contact with the metal rims of the cup and partly by contact with the leather.
2. The wear automatically occurs at the plate 13, cup 19 and leather disc 29 in such a fashion that the condition in (1) above is maintained over substantially the whole life of the clutch.
3. When the clutch is energized, pressure of plate 13 against leather disc 29 causes some of the silicone oil lightly to lubricate the surfaces between the plate and the rims of the cup, thereby reducing wear and eliminating both noise and seizure between the parts. When deenergized the leather disc tends to reabsorb the extruded oil.
4. The lubricity characteristic of silicone oils contribute to the driving efficiency of the clutch.

A clutch made according to the invention has been operated by the applicant in the rewind (slip) made for 1400 hours with little wear, substantially constant torque, low (150° F) temperature rise and with low power requirements. Typical performance data for a clutch using a 1⅝ inch diameter cup is as follows;

| Mode | Torque | Power |
| --- | --- | --- |
| reverse take-up | 40 in. oz. | 55 m.a., .8 volts |
| rewind | 104 in. oz. | 400 m.a., 4 volts |

When the clutch is used in the braking mode the charge of a capacity is applied to the coil in order to slow down and stop the shaft in a gradual manner. In a typical application for a 16mm motion picture projector reel arm, a capacitor initially charged at between 9 and 10 volts stops a loaded film reel in approximately 4 seconds.

What is claimed is:

1. A magnetic clutch having a rotary power input structure comprising a flat, annular plate, and an output structure comprising two coplanar, spaced apart non-resilient friction surfaces and a third planar, lubricant impregnated resilient friction surface located between said two coplanar surfaces, and magnetic flux generating means within said output structure, said plate and said friction surfaces of said output structure being coaxial and juxtapositioned so that the plate is drawn against the output structure when a magnetic flux is applied to the plate.

2. A magnetic clutch as described in claim 1, the surface of said resilient friction surface extending beyond the plate of the non-resilient friction surfaces between three and twelve thousandths of an inch in the direction of said plate.

3. A magnetic clutch as claimed in claim 1, said plate engaging in frictional relationship with both the non-resilient friction surfaces and the resilient friction surface upon application of magnetic flux.

4. A magnetic clutch as described in claim 1, said resilient friction disc being impregnated with silicone oil.

5. In a magnetic clutch having a rotary power input structure, a power output structure including an output shaft coaxial with said power input and output structures, and a magnetic flux producing coil in the power output structure, a friction plate of magnetic material carried by and rotatable with said power input structure and axially movable relative to said power input structure, said power output structure including an annular cup-shaped member of magnetic material and containing said flux producing coil, said cup-shaped member presenting two spaced annular coplanar end portions in juxtaposition to said friction plate, and an annular strip of oil impregnated resilient friction material filling the space between the annuli of the cup-shaped member so that flux from the coil, flowing through the cup and the friction plate moves the latter into contact with the annular sections of metal and friction material.

6. A magnetic clutch as described in claim 5, said resilient friction member presenting a planar surface which extends beyond the plane of the ends of the non-resilient friction members between three and twelve thousandths of an inch in the direction of the friction plate.

7. A magnetic clutch as described in claim 5 in which the friction plate is in engagement with both the non-resilient friction members and the resilient friction members when energized.

8. A magnetic clutch as claimed in claim 5 in which said resilient friction member is a disc impregnated with silicone oil.

9. A magnetic clutch as claimed in claim 5 in which said resilient member is a friction leather disc.

* * * * *